UNITED STATES PATENT OFFICE.

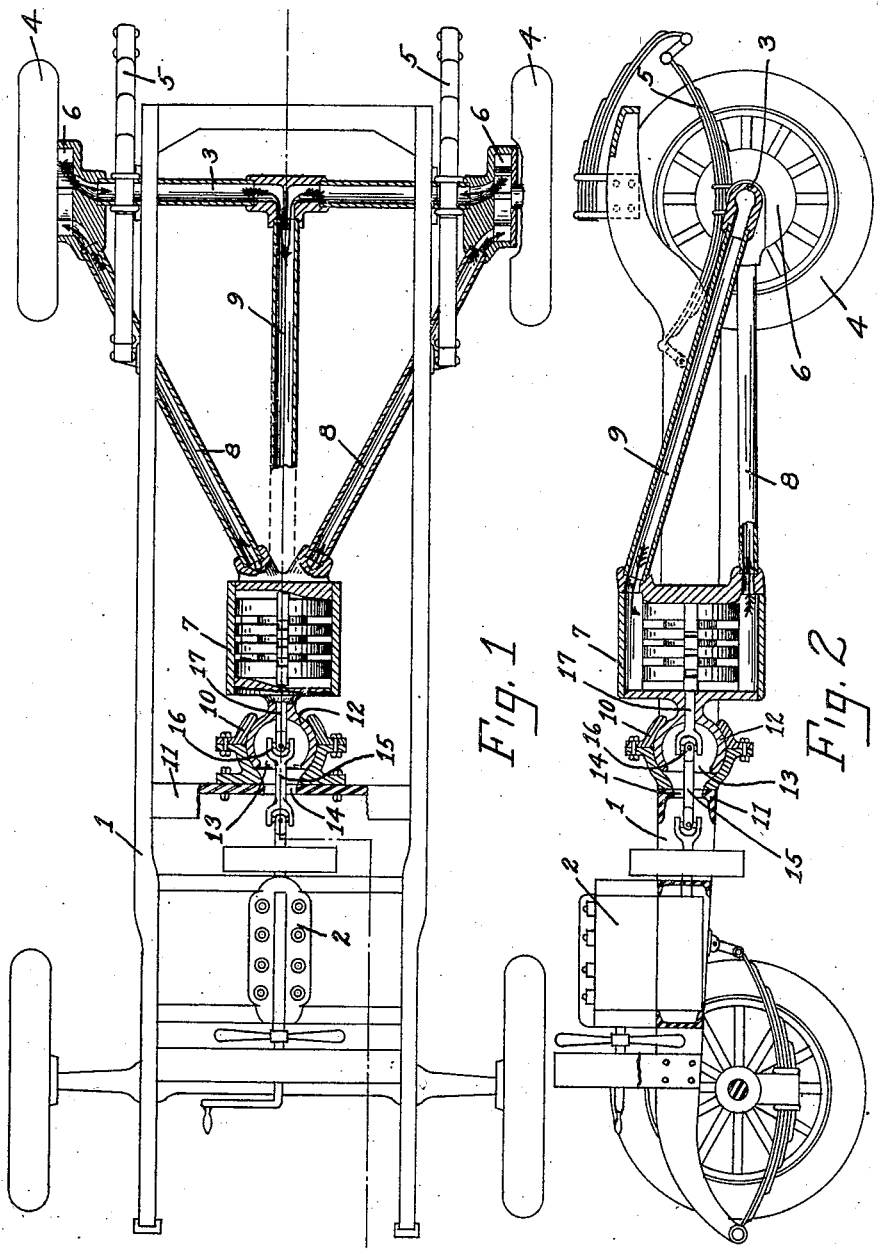

ALBERT F. ROCKWELL, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

MOTOR-VEHICLE.

961,372.  Specification of Letters Patent.  Patented June 14, 1910.

Application filed March 12, 1910.  Serial No. 548,915.

*To all whom it may concern:*

Be it known that I, ALBERT F. ROCKWELL, a citizen of the United States, residing at Bristol, county of Hartford, State of Connecticut, have invented a certain new and useful Motor-Vehicle, of which the following is a full, clear, and exact description, such as will enable others skilled in the art to which it appertains to make and use the same, reference being had to the accompanying drawings, forming part of this specification.

My invention relates to motor vehicles, my object being to provide a structure in which a fluid driving medium can be employed.

To this end, and also to improve generally upon devices of the character indicated, my invention consists in the various matters hereinafter described and claimed.

It has heretofore been proposed to propel motor vehicles by means of a circulating liquid. In such structures a pump has been supported upon the main frame of the vehicle and driven by the usual engine, a fluid motor has been provided for each traction wheel, and pipes have connected said pumps with said fluid motors, the usual engine driving the pump and the pump causing a liquid to circulate through said fluid motors. Such fluid motor propulsion has many marked advantages over the shaft or chain drive commonly employed. For example, it entirely obviates reduction gears, change-speed gears and any shiftable clutch between the engine and the driving mechanism. It permits the engine to be in constant connection with the pump and permits the speed to be controlled directly from the engine without jerk or jar. But, although various attempts have been made, it has heretofore been impracticable to employ such fluid propulsion because, for comfort in riding, the traction wheels of a motor vehicle are, through the usual rear springs, movably connected to the main frame which supports the engine and has supported said pump, so that it has been necessary to provide flexible pipes (or pipes having flexible joints) between said pump and said fluid motors, and, as the fluid is necessarily driven through these pipes at high pressure, such pipes have invariably leaked, thus rendering the mechanism useless. My present invention obviates such flexible pipes and pipes having flexible joints and provides an easily constructed and inexpensive structure in which the highly desirable but hitherto impracticable fluid propulsion is utilized.

In the accompanying drawings Figure 1 is a plan view partly in section; and Fig. 2 is an elevation partly in section.

In the illustrated embodiment of my invention, the usual main frame 1 carries the engine 2 in the well understood manner, and the transverse tube or rear axle-tree 3, carrying the usual traction wheels 4, is connected to said frame 1 through the medium of the usual springs 5, there thus being the customary movement between said axle-tree and frame to permit easy and comfortable riding. The fluid motors 6 are mounted upon said axle-tree and connected to the said traction wheels to propel the latter, said axle-tree being hollow to permit the passage of the fluid from said motors. The casing of the pump 7 is connected by the inflexible side tubes 8 with the inlet side of said fluid motors 6, and said pump has its own inlet side connected by the longitudinal tube 9 with said hollow axle-tree 3, whereby the pump, a pipe 8, a motor 6, the hollow axle or tube 3 and the return pipe 9 constitute a closed system for the circulation of the fluid, and the said pipes or tubing constitute a wheel-frame for carrying the said traction wheels. The pump casing is flexibly connected with said frame 1, as by the ball and socket joint illustrated. The socket 10 is shown upon the cross bar 11 of the frame and the ball 12 is shown upon the casing of the pump 7. Said ball has an opening 13 therethrough and the cross bar 11 has an opening 14 alining with said opening 13, the drive shaft 15 from the engine extending through said openings into the center of said ball and being there connected by a universal joint 16 with the shaft 17 of the pump 7. The engine shaft 15 drives the pump 7 and this pump propels the liquid through the fluid motors 6, whereby the vehicle is driven. The rear axle-tree 3 has the necessary and desirable swinging movement with respect to the frame 1, but the pipes 8 and 9 and their joints are stiff and rigid, thus totally eliminating flexible pipes and flexible joints in the fluid circuit. Thus, by flexibly connecting the pump with the frame and rigidly connecting this pump with the axle-tree of the traction wheels, I provide a vehicle in which the said traction wheels have the necessary swinging connection with respect to the frame while the desirable fluid propulsion can nevertheless be utilized, the tubes 3, 8 and 9 not only providing a strong frame for the traction wheels but also presenting a closed circuit for the fluid entirely free from any flexible piping or flexible pipe joints.

Having thus described my invention, what I claim as new and desire to secure by Letters Patent is—

1. In a motor vehicle, the combination with a frame, and an engine supported thereby, of traction wheels having movement toward and away from said frame, a fluid motor in driving connection with said traction wheels, a pump flexibly connected to said frame, inflexible piping rigidly connecting said pump and said motor, and driving connection between said pump and said engine; substantially as described.

2. In a motor vehicle, the combination with a main frame, and an engine supported thereby, of a rigid wheel-frame composed of inflexible tubing and having movement toward and away from said main frame, wheels carried by said wheel-frame, a fluid motor in driving connection with said wheels and having its casing rigidly connected to the tubes of said wheel-frame and in communication therewith, a pump flexibly connected to said main frame and having its casing rigidly connected to said tubes and in communication therewith, and driving connection between said pump and said engine; substantially as described.

3. In a motor vehicle, the combination with a main frame, and an engine supported thereby, of a wheel-frame comprising a transverse tube, a longitudinal tube in communication therewith, and side tubes, said tubes being rigid and said wheel-frame having movement toward and away from said main-frame, wheels upon said wheel-frame, a fluid motor for each of said wheels, each said motor having its casing rigidly connected with said transverse tube and one of said side tubes and being in communication with said tubes, a pump flexibly connected to said main frame and having its casing rigidly connected with said side tubes and said longitudinal tube and in communication with said tubes, and driving connection between said pump and said engine; substantially as described.

4. In a motor vehicle, the combination with a frame, and an engine supported thereby and provided with a shaft, of traction wheels having movement toward and away from said frame, a fluid motor in driving connection with said traction wheels, a pump flexibly connected to said frame and provided with a shaft, inflexible piping rigidly connecting said pump and said motor, and flexible driving connection between said pump shaft and said engine shaft; substantially as described.

In testimony whereof, I hereunto affix my signature, in the presence of two witnesses.

ALBERT F. ROCKWELL.

Witnesses:
GEORGE L. SANFORD,
JOSEPH D. BROWN.